United States Patent [19]

Nguyen

[11] Patent Number: 5,383,118
[45] Date of Patent: Jan. 17, 1995

[54] DEVICE ALIGNMENT METHODS
[75] Inventor: Hung N. Nguyen, Bensalem
[73] Assignee: AT&T Corp., Murray Hill, N.J.
[21] Appl. No.: 948,543
[22] Filed: Sep. 23, 1992
[51] Int. Cl.⁶ .................... G05B 19/18; G02B 6/26
[52] U.S. Cl. .................. 364/167.01; 364/559; 385/32; 385/134; 356/388; 356/400
[58] Field of Search .................. 364/167.01, 525, 559; 385/31, 32, 33, 134; 356/399, 400, 152, 153, 388, ; 250/208.1; 156/538, 539

[56] References Cited

U.S. PATENT DOCUMENTS

| | | | |
|---|---|---|---|
| 4,396,945 | 8/1983 | DiMatteo et al. | 356/375 |
| 4,481,533 | 11/1984 | Alzmann et al. | 356/396 |
| 4,542,956 | 9/1985 | McCrickerd | 385/136 |
| 4,679,908 | 7/1987 | Goodwin | 385/91 |
| 4,722,587 | 2/1988 | Thorsten | 385/115 |
| 4,724,430 | 2/1988 | Hecker et al. | 356/375 |
| 4,750,928 | 3/1988 | Gabriel et al. | 356/400 |
| 4,772,123 | 9/1988 | Radner | 356/400 |
| 4,845,373 | 7/1989 | Jamieson et al. | 356/400 |
| 4,854,667 | 8/1989 | Ebata et al. | 385/134 |
| 4,946,553 | 8/1990 | Courtney et al. | 385/33 |
| 4,971,444 | 11/1990 | Kato | 356/375 |
| 4,978,190 | 12/1990 | Veith | 385/33 |
| 4,984,885 | 1/1991 | Ortiz, Jr. | 356/153 |
| 4,997,279 | 3/1991 | Gordon et al. | 356/400 |
| 5,225,026 | 7/1993 | Ozawa et al. | 156/378 |

OTHER PUBLICATIONS

"An Optical Alignment Robot System," C. Gabler et al., *SPIE Integration and Packaging of Optoelectronic Devices*, vol. 703, 1986, pp. 8–28.

Microglide® 250 Brochure of Anorad Corporation, Hauppauge, N.Y. 11788, 1989.

*Primary Examiner*—Paul Gordon
*Attorney, Agent, or Firm*—Roderick B. Anderson

[57] ABSTRACT

First and second devices, such as a laser (11) and an optical fiber (12), are aligned by first positioning the laser on an x-y-z table (13) (such a table is capable of responding to electrical signals to make precise movements in mutually orthogonal x,y and z directions). The laser beam is imaged onto a machine vision camera (19) which develops signals representing the image of the laser beam and directs them to a computer (16). The computer analyzes the signal, calculates the center of the image, and determines from such calculation any deviations in the x and y directions of the position of the laser from its desired alignment position. Next, the optical fiber (12) is imaged on a machine vision camera (17). Signals from the camera representative of the image of the optical fiber end are directed to the computer (16) which calculates the center of the image and determines any deviation from its desired position. Finally, the x-y-z table is moved such that the laser is in approximate alignment with the optical fiber end, and signals from the computer are used to make fine adjustments of the position of the x-y-z table to compensate for the deviations of the laser from its assigned position and deviations of the optical fiber end from its assigned position.

17 Claims, 3 Drawing Sheets

DEVICE ALIGNMENT METHODS

TECHNICAL FIELD

This invention relates to methods and apparatus for aligning devices and, more particularly, to methods for aligning optical or photonics devices with a high degree of precision.

BACKGROUND OF THE INVENTION

With the advent of optical communications systems, considerable development work has been done on methods for assembling components of such systems. One of the problems associated with assembling such components is a need for precise alignment of optical elements such as lenses, optical fibers, lasers, mirrors and photodetectors. It is important that factory methods be developed for assembling optical devices and packages in an efficient manner, with a minimum requirement of operator skill, but with an exceedingly high degree of precision.

In making laser modules, for example, it is necessary to bond an optical fiber in precise alignment to a semiconductor laser to maximize the portion of the laser output that is directed into the end of the optical fiber. For obtaining maximum optical coupling, it is typically desired that the center of the optical fiber be aligned with the center of the laser to within tolerances of less than one micron. The most common way of making this alignment is a process known as "active alignment," in which light is emitted from the laser, with the position of the end of the optical fiber near the laser being adjusted until the light transmitted through the fiber reaches a maximum.

For automatic assembly of laser modules using active alignment, it is usually required that some apparatus be devised for causing one end of the optical fiber to scan a small area intercepting the laser output beam, while a photodetector at the output end of the fiber detects the location at which maximum light transmission occurs. When that position has been determined, the optical fiber is permanently bonded to the laser and enclosed within a package.

It can be appreciated that mechanical scanning of an optical device such as an optical fiber is inherently time consuming, and, as the need for greater volumes of mass-produced components increases, such time consumption becomes increasingly detrimental. Of course, the alternative of manually adjusting the fiber orientation to achieve active alignment is even less practical because of the operator skill required, as well as the time consumed. Accordingly, there is a continued, long-felt need for better and more efficient methods for aligning, assembling and mass-producing optical and/or photonics components.

SUMMARY OF THE INVENTION

In accordance with an illustrative embodiment of the invention, first and second devices, such as a laser and an optical fiber, are aligned by first positioning the laser on an x-y-z table (such a table is capable of responding to electrical signals to make precise movements in mutually orthogonal x,y and z directions). The laser beam is imaged onto a machine vision camera which develops signals representing the image of the laser beam and directs them to a computer. The computer analyzes the signal, calculates the center of the image, and determines from such calculation any deviations in the x and y directions of the position of the laser from its desired alignment position. Next, the optical fiber is imaged on a machine vision camera. Signals from the camera representative of the image of the optical fiber end are directed to the computer which calculates the center of the image and determines any deviation from its desired position. Finally, the x-y-z table is moved such that the laser is in approximate alignment with the optical fiber end, and signals from the computer are used to make fine adjustments of the position of the x-y-z table to compensate for the deviations of the laser from its assigned position and deviations of the optical fiber end from its assigned position. After the laser and the optical fiber end are aligned in close proximity, they are bonded together in permanent alignment for subsequent packaging.

Commercially available equipment can be used to move the laser very rapidly between its position at which it is imaged and the position in which it is aligned. Very rapid determinations of deviations from prescribed alignment can be made, and signals generated for adjusting the position of the laser to be in precise alignment to the optical fiber. Little operator skill is required for the process and it can be accomplished repetitively and rapidly as is required for volume mass-production.

These and other objects, features and advantages of the invention will be better understood from a consideration of the following detailed description taken in conjunction with the accompanying drawing.

DETAILED DESCRIPTION

Figure 1:
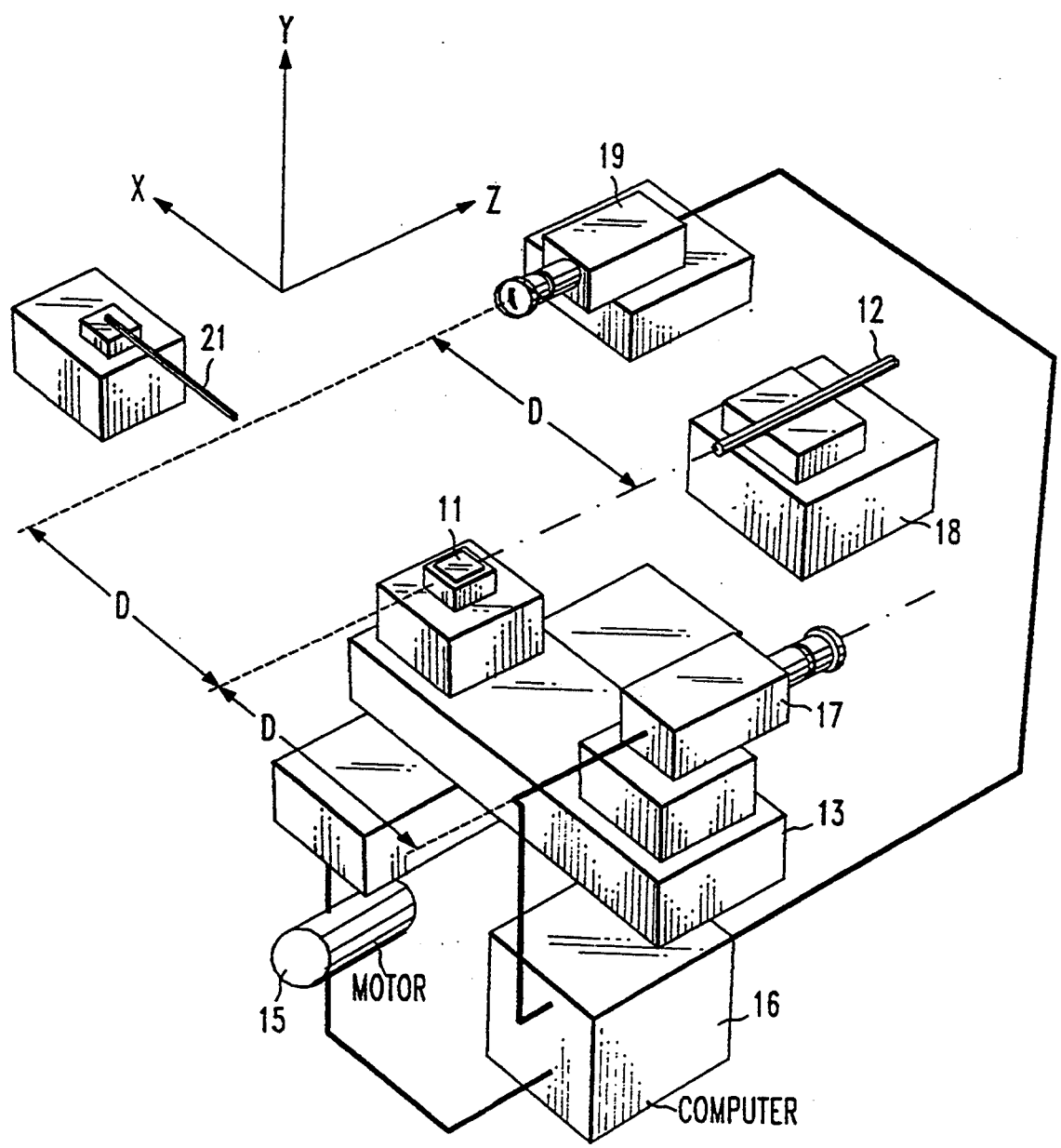
FIG. 1 is a schematic view of apparatus for aligning a laser with an optical fiber in accordance with an illustrative embodiment of the invention.

The drawings are not necessarily to scale and have been simplified to aid in clarity of exposition. Referring now to FIG. 1, there is shown schematically an illustrative embodiment of the invention comprising apparatus for aligning and bonding together a semiconductor laser 11 and an optical fiber 12. The laser is mounted on an x-y-z table 13 which is capable of moving the laser in orthogonal x-y-z directions either in large increments or in incremental steps as small as 0.01 microns. The table is driven by a motor schematically shown at 15 which is controlled by signals from a computer 16. The x-y-z table may be of a type which is commercially available from the Anorad Corporation of Hauppauge, New York, U.S.A. Also mounted on the x-y-z table is a machine vision camera 17.

The optical fiber 12 is in approximate axial alignment with the laser 11 as is required for bonding them together, but it is located on a stationary support 18. Also located on a stationary support is a machine vision camera 19. Machine vision cameras is 17 and 19 are preferably conventional television cameras, but their function is to generate machine-readable video signals rather than video signals for visual display. Accordingly, any device, such as an array of photodetectors, capable of generating machine-readable signals representative of an image could be used as a machine vision camera.

The outputs of machine vision cameras 17 and 19 are connected to the computer 16. The aligned photodetector and fiber are separated from camera 17 by a distance D and from camera 19 by a distance D. Also separated by a distance D from the laser 11 is an electronic probe 21 for biasing the laser 11.

Figure 2:
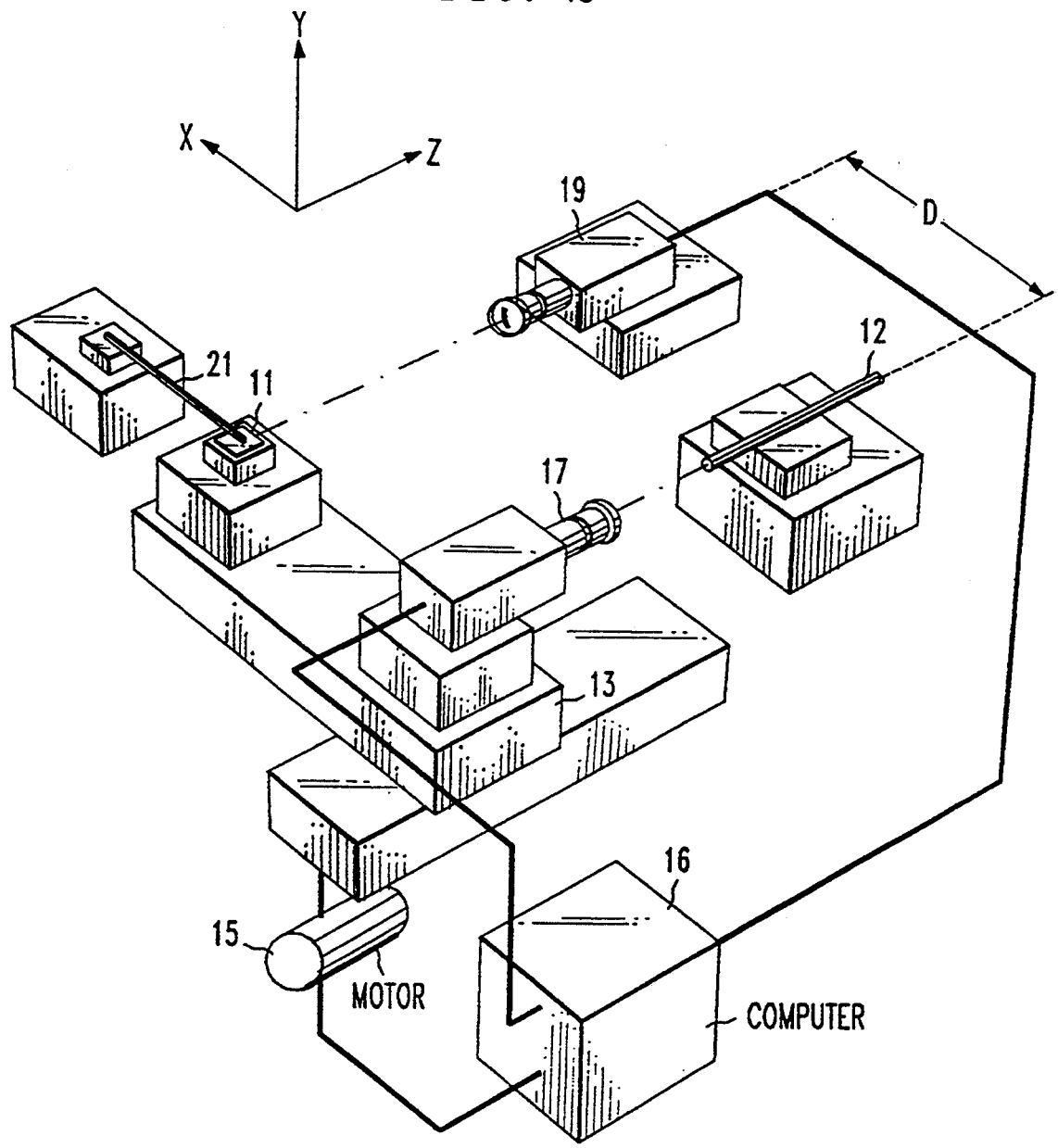
FIG. 2 is an illustration of the apparatus of FIG. 1 at another phase of its operation.

While FIG. 1 shows the laser 11 being in alignment with the central axis of the optical fiber, such alignment can initially be made only approximately, and it is the purpose of this embodiment to adjust the alignment to be exact to within a fraction of a micron. Specifically, it is intended that the elements be aligned to maximize the portion of light emitted from the laser that is intercepted and transmitted by the core of the fiber which lies along the central axis of the fiber. The first step in accomplishing this function is to move the x-y-z table 13 in the x direction a distance D, to the position shown in FIG. 2. At this position, the probe 21 contacts the laser 11 which, when appropriately energized, emits light in the direction of machine vision camera 19. In the position shown in FIG. 2 the laser 11 is in approximate alignment with machine vision camera 19, and consequently the emitted laser beam is easily within the field of view of the camera 19. The camera 19 contains lenses for imaging the laser light, and an electron beam for scanning the image to generate a video signal representative of the image.

Figure 3:
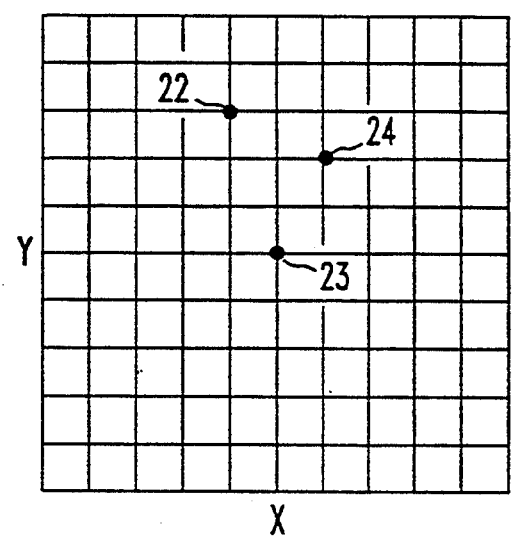
FIG. 3 is a graphical illustration of alignment deviations.

The video signal is directed to a computer 16 which is programmed to locate the geometrical center of the image. Machine vision systems including computers are well-known in the art, and one that is capable of producing the appropriate signals is a system available from Cognex, Inc., Needham, Mass. Referring to FIG. 3, the computer, after determining the center of the laser beam, compares its location, such as location 22, with a location 23 that would represent perfect alignment. One can see that, with the ordinates shown, 22 is at approximately $x=-1$ and $y=+3$ with respect to location 23. The difference of position of locations 22 and 23 represents the misalignment, or deviation from precise alignment, of the laser beam.

In the same manner, a machine vision camera 17 generates signals representative of the image of the end of optical fiber 12 which are directed to the computer for determination of the geometric center at the end of fiber 12. Notice that in the position shown in FIG. 2, camera 17 is in approximate alignment with optical fiber 12, and therefore the end of the optical fiber, in a section taken transverse to the fiber central axis, is within the field of view of the camera 17. Referring to FIG. 3, the calculated center of the end of optical fiber 12, which normally coincides with the center of the fiber core, may be determined to be at location 24 which is at $x=+1, y=+2$ with respect to a location 23 which represents perfect alignment. The x-y-z table 13 is extremely accurate in its mechanical movements so it is capable of returning to the exact position shown in FIG. 1.

The computer generates a correction signal representative of the difference in alignment of points 22 and 24 of FIG. 3. That is, in the example shown, the computer generates a corrective signal to move the location 22 of laser 11 in the x direction a distance $x=+2$ and in the y direction a distance $y=-1$. This makes end points 22 and 24 to be coincident and brings the laser 11 into substantially exact alignment with the optical fiber 12.

This function can be stated as follows: If the initial misalignment of the laser is $A_x, A_y$ and the initial misalignment of the fiber is $B_x, B_y$, the computer generates a corrective signal equal to $(A_x - B_x)$, $(A_y - B_y)$ to bring the laser into alignment with the fiber. Programming the computer to perform this simple function is within the skill of the worker in the art.

Figure 4:
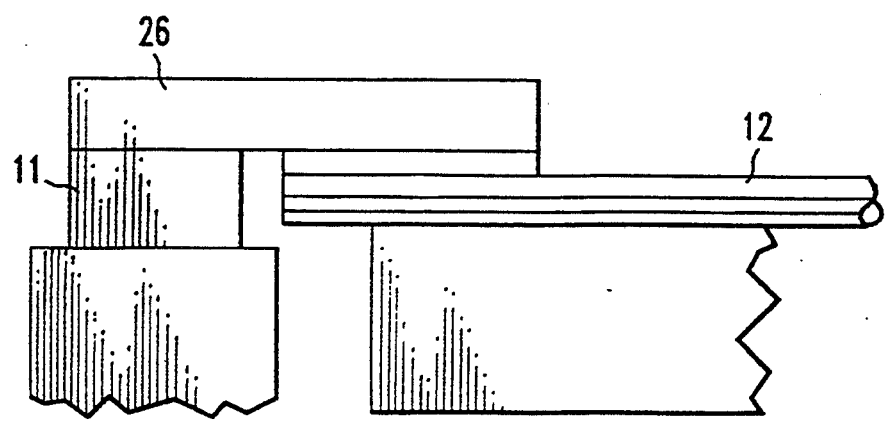
FIG. 4 is a schematic view showing how the laser and optical fiber of FIGS. 1 and 2 may be bonded together.

After alignment, the computer causes the x-y-z table to move in the z direction to bring the laser into sufficient proximity with the optical fiber 12 that they can be bonded. This is schematically shown in FIG. 4 where a mounting element 26 is shown as being bonded both to laser 11 and optical fiber 12. The bonding can be made by epoxy, solder, or other methods as are known in the art and can be done manually or automatically through the use of robotic apparatus known in the art.

An advantage of the alignment scheme that has been described is that it can be operated automatically at a higher production rate than the active alignment method of aligning an optical fiber with a laser. This is important in the mass production of laser assemblies where many such identical assemblies may be required for a complex optical communications system. While a preferred method of aligning a laser with a fiber has been described, it is to be understood that other devices such as lenses, mirrors, photodetectors, etc., could be aligned and assembled by the same method and that significant deviations from the method shown could be made. In the embodiment described, the laser beam is imaged on the machine vision camera, but it is to be understood that this is the equivalent of imaging the laser device on the machine vision camera and that the method aligns the laser device, as well as the beam, with the optical fiber. In practice, aligning the laser while it emits light is preferable because it assures alignment of the center of emitted light with the center of the optical fiber. While it is advantageous to have the two cameras each located a distance D from the aligned fiber and laser as shown so that one movement of the x-y-z table will bring both cameras into alignment, such configuration is not essential. The invention can be used to align laser arrays or photodetector arrays with fiber bundles or lens arrays. Other embodiments and modifications may be made by those skilled in the an without departing from the spirit and scope of the invention.

I claim:

1. A method for aligning a first device with a second device comprising the steps of:

positioning a first device on a movable x-y-z table;

moving the movable table such that the first device is in approximate alignment with a first machine vision camera;

a second machine vision camera being mounted on the movable table along with the first device;

imaging a first feature of the first device in the first machine vision camera;

directing signals from the first machine vision camera representative of the image of the first feature to a computer;

using the computer to calculate the center of the image of the first feature and to determine from such calculation any deviations in x and y orthogonal directions of the position of the first device from a first predetermined position;

the moving step moving the second machine vision camera such that the second device is in approximate alignment with the second machine vision camera;

imaging a second feature of the second device in the second machine vision camera;

directing signals from the second machine vision camera representative of the image of the second feature to said computer;

using the computer to calculate the center of the image of the second feature and to determine from such calculation any deviations in the x and y directions of the position of the second device from a second predetermined position;

moving the movable table such that the first device is in alignment with the second device, and using signals from the computer to make fine adjustments of the movable table to compensate for said deviations of the first feature from a first predetermined position and for deviations of the second feature from a second predetermined position.

2. The method of claim 1 wherein:

steps of calculating and using said calculations comprise the steps of using the computer to calculate the respective centers of the first and second features, comparing such calculated centers to predetermined locations which represent alignment of the first and second features, generating corrective electrical signals representing any deviations of the locations of the centers of the first and second features, and using the corrective electrical signals to adjust a motor which moves the x-y-z table so as to align the centers of the first and second features.

3. The method of claim 2 wherein:

the motor constitutes part of the x-y-z table;

the first and second machine vision cameras are television cameras:

and the first and second devices are optical devices.

4. The method of claim 1 wherein:

the first and second machine vision cameras are television cameras.

5. The method of claim 1 wherein:

the first and second machine vision cameras are mounted such that a single movement of the movable table simultaneously brings the first device into approximate alignment with the first machine vision camera and the second device into approximate alignment with the second machine vision camera.

6. The method of claim 5 wherein:

the first device is a light-emitting device;

the step of imaging the first feature comprises the step of imaging light emitted from the first device in the first machine-vision camera; and the second device is an optical fiber.

7. The method of claim 5 wherein:

when the first device is approximately aligned with the second device, the x distance of the first and second devices from the first machine vision camera is a distance D, and the distance of the first and second devices from the second machine vision camera in the opposite x direction is a distance D, whereby movement of the first device in the x direction a distance D to bring it into the field of view of the first machine vision camera also brings the second device into the field of view of the second machine vision camera.

8. Apparatus for aligning a first device with a second device comprising;

a movable x-y-z table;

a first machine vision camera;

means for supporting the first device on the movable x-y-z table;

means for imaging a first feature of the first device onto the first machine vision camera;

means for directing signals from the first machine vision camera representative of the image of the first feature to a computer;

means comprising the computer for calculating the center of the image and determining from such calculations any deviations in x and y orthogonal directions of the position of the first feature from a first predetermined position;

a second machine vision camera;

means for imaging a second feature of the second device on the second machine vision camera;

means for directing signals from the second machine vision camera representative of the image of the second feature to said computer;

means comprising said computer to calculate the center of the image of the second feature and to determine from such calculation any deviations in the x and y directions of the position of the second feature from a second predetermined position;

means comprising the movable table for moving the first device to be in approximate alignment with the second device;

means comprising the computer for generating a signal proportional to the difference of deviation in the x and y directions of the first feature and the second feature; and means for using the signals from the computer to make fine adjustments of the movable table to compensate for deviations of the first feature from the first predetermined position and the second feature from the second predetermined position.

9. The apparatus of claim 8 wherein:

the first and second machine vision cameras are television cameras.

10. The apparatus of claim 9 wherein:

the second machine vision camera is mounted on the movable table along with the first device;

and means for moving the movable table from a first position at which the first device is in approximate alignment with the second device to a second position at which the first device is in approximate alignment with the first machine vision camera and the second device is in approximate alignment with the second machine vision camera.

11. The apparatus of claim 10 wherein:

with the x-y-z table in the first position, the x distance of the first and second devices from the machine vision camera is a distance D, and the x distance of the first and second devices from the second machine vision camera in the opposite x direction is a distance D, whereby movement of the x-y-z table in the x direction a distance D to bring it to the second position brings the first device into the field of view of the first machine vision camera and the second device into the field of the second machine vision camera.

12. The apparatus of claim 11 wherein:

the computer comprises means for calculating the respective centers of the first and second features and for comparing such calculated centers to predetermined locations which represent alignment of the first and second features, and for generating corrective electrical signals representing any deviations of the locations of the first and second features;

and the means for moving the x-y-z table comprises a motor for using the corrective electrical signals to move the x-y-z table so as to align the centers of the first and second features.

13. The apparatus of claim 8 wherein:
the first device is a light-emitting device;
and the means for imaging the first feature comprises means for imaging a light beam emitted from said light-emitting device.

14. The apparatus of claim 13 wherein:
the light-emitting device is a laser;
the second device is an optical fiber having a central axis and a core lying along such axis;
and the means for imaging the second feature comprises means for imaging a section of the optical fiber taken transverse to the central axis, whereby the center of the image of the fiber lies within the image of said core.

15. A method of bonding a first device in precise alignment with a second device comprising the steps of:
mounting a first device and a second machine vision camera on a movable table;
imaging the first device on a first machine vision camera to develop a first electrical output signal which is descriptive of the image of a first feature of the first device, said step comprising moving the movable table to bring the first device into the field of view of the first machine vision camera;
using the first output signal of the first machine vision camera to calculate the position of the center of the first feature;
imaging the second device on a second machine vision camera to develop a second electrical output descriptive of the image of a second feature of the second device comprising moving the movable table to bring the second device into the field of view of the second machine vision camera;
using the second output signal to calculate the position of the center of the second feature;
using said calculations to move the first device such that the center of the first feature is in alignment with the center of the second feature; and
bonding together the first and second devices.

16. A method of bonding a first device in precise alignment with a second device comprising the steps of:
imaging the first device on a first machine vision camera to develop a first electrical output signal which is descriptive of the image of a first feature of the first device;
using the first output signal of the first machine vision camera to calculate the position of the center of the first feature;
imaging the second device on a second machine vision camera to develop a second electrical output descriptive of the image of a second feature of the second device;
using the second output signal to calculate the position of the center of the second feature;
using said calculations to move the first device such that the center of the first feature is in alignment with the center of the second feature;
the steps of calculating and using said calculations comprising the steps of using a computer to calculate the respective centers of the first and second features, comparing such calculated centers to predetermined locations which represent alignment of the first and second devices, generating corrective electrical signals representing any deviations of the first and second devices from alignment, and using the corrective electrical signals to adjust a motive device which moves the first device so as to align the first and second devices;
and bonding together the first and second devices.

17. A method of bonding a first device in precise alignment with a second device comprising the steps of:
imaging the first device on a first machine vision camera to develop a first electrical output signal which is descriptive of the image of a first feature of the first device;
using the first output signal of the first machine vision camera to calculate the position of the center of the first feature;
imaging the second device on a second machine vision camera to develop a second electrical output descriptive of the image of a second feature of the second device;
using the second output signal to calculate the position of the center of the second feature;
using said calculations to move the first device such that the center of the first feature is in alignment with the center of the second feature;
the steps of calculating and using said calculations comprising the steps of using a computer to calculate the respective centers of the first and second features;
comparing such calculated centers to determine any deviation ($A_x$, $A_y$) of the location of the first feature from a location which represents alignment of the first feature, and any deviation ($B_x$, $B_y$) of the location of the second feature from a location which represents alignment of the second feature, generating a corrective electrical signal equal to ($A_x - B_x$), ($A_y - B_y$) representing the net deviation of the first feature from an alignment position of the first and second features, and using the corrective signal to adjust a motive device which moves the first device so as to align the first and second devices; and
bonding together the first and second devices.

* * * * *